United States Patent [19]
Cassetti et al.

[11] Patent Number: 5,696,938
[45] Date of Patent: Dec. 9, 1997

[54] COMPUTER SYSTEM PERMITTING MULITPLE WRITE BUFFER READ-AROUNDS AND METHOD THEREFOR

[75] Inventors: David K. Cassetti, Tempe; Timothy L. Wilson, Phoenix, both of Ariz.

[73] Assignee: VLSI Technology, Inc., San Jose, Calif.

[21] Appl. No.: 690,050

[22] Filed: Jul. 31, 1996

Related U.S. Application Data

[63] Continuation of Ser. No. 298,987, Aug. 31, 1994, abandoned.

[51] Int. Cl.⁶ ....................................................... G06F 12/08
[52] U.S. Cl. ........................... 395/470; 395/445; 395/250
[58] Field of Search .................................... 395/250, 445, 395/468, 462, 465, 470, 471

[56] References Cited

U.S. PATENT DOCUMENTS

| | | | |
|---|---|---|---|
| 4,805,098 | 2/1989 | Mills, Jr. et al. | 395/250 |
| 5,179,679 | 1/1993 | Shoemaker | 395/445 |
| 5,418,755 | 5/1995 | Nguyen et al. | 365/230.08 |

*Primary Examiner*—Eddie P. Chan
*Assistant Examiner*—Kevin L. Ellis
*Attorney, Agent, or Firm*—Harry M. Weiss & Associates

[57] ABSTRACT

A computer system is disclosed that permits multiple write buffer read-arounds. The system comprises a CPU (Central Processing Unit) for executing cycles for the computer system, a cache coupled to the CPU for storing data, a write buffer coupled to the CPU for receiving write data from the CPU, an arbiter to control bus accesses to the slave, and processing signals coupled between the cache and the write buffer for permitting the CPU to read-around the write buffer a plurality of times before the write data in the write buffer is flushed therefrom. The processing signals determine when the data stored in the write buffer is also stored in the cache, and, therefore, the cache is permitted to read-around the write buffer more than one time as long as the write buffer has the same data stored therein as exists in the cache.

19 Claims, 1 Drawing Sheet

COMPUTER SYSTEM PERMITTING MULITPLE WRITE BUFFER READ-AROUNDS AND METHOD THEREFOR

This is a continuation of application Ser. No. 08/298,987 filed on Aug. 31, 1994, now abandoned.

BACKGROUND OF THE INVENTION

1. Field of the Invention

This invention relates generally to computer systems and, more specifically, to a computer system permitting multiple write buffer read-arounds prior to a write buffer flush and a method therefor.

2. Description of the Related Art

This computer system is designed primarily to improve upon the memory latency problems of the prior art. In particular, one major factor in the memory latency problem of the prior art is associated with read-arounds, a term well-known in the art. For the benefit of those who may not be familiar with the term, the following basic explanation is provided.

CPU's operate at much faster speeds than do the memory devices with which they communicate. Prior to the advent of the cache, the slow access times associated with RAM (Random Access Memory) and ROM (Read Only Memory), relative to the faster operating speed of the CPU, caused memory latency as the CPU waited for the slower memory devices during read and/or write cycles. When cache memory devices were instituted, there was a marked improvement in memory latency due the faster access times for the cache type memories relative to the access times for RAM and ROM. In addition, a Write Buffer was used to provide fast access times for memory writes to the slave device, thus allowing concurrent cache accesses during memory writes.

Nonetheless, cache memory in conjunction with a Write Buffer produces another problem with memory latency in the case of a read miss. In this case, assume that the CPU has written some data to the WB (Write Buffer). Also, assume that the CPU executes a memory read cycle; if the desired data is in the cache, the data is delivered to the CPU from the cache on relatively short order.

However, assume that on a subsequent read cycle, the desired data is not in the cache. In this case, the CPU must get the desired data from the main memory or RAM, and, of course, the slower access time associated with the RAM causes higher memory latency than that associated with the cache. The data read from the main memory is typically written to the cache based on the assumption that it may again be needed by the CPU at a later time, and having this data in the cache will improve memory latency.

As previously explained, when the CPU executes a read cycle and the desired data is not in the cache, the CPU must read data from the main memory. However, the CPU may have recently written data to the write buffer, and it is possible that the data that the CPU really needs is still in the write buffer, because the write buffer may not have written its data to the main memory. In this case, there are basically three prior art approaches to ensure that the CPU gets the proper data from the main memory.

In one of the prior art cases, the CPU waits for the write buffer to send or flush its data to the main memory in order to ensure that the data the CPU gets from main memory is correct. As the computer operates and the number of write buffer flushes increases, the total delay can be substantial, and it is therefore a problem that slows the overall system speed. An alternative approach is referred to as address snooping. In this prior art approach, a complex series of logic gates are implemented in order to determine if the address the CPU is looking for is in the write buffer. In this manner, when the CPU fails to find the required data in the cache, it can check to see if the data is in the write buffer prior to reading the main memory, thereby ensuring that the correct data is either already in the main memory or that it is flushed from the write buffer to the main memory. The use of address snooping on the write buffer adds additional cost and complexity, since the address of each entry in the write buffer must be snooped. A third prior art approach is sometimes referred to as the read-around once approach. A read-around occurs when a CPU read miss is allowed ahead of a Write Buffer request. In this method, when the CPU fails to find the required data in the cache, it can read-around the write buffer one time when the data stored in the write buffer is also in the cache. However, upon a subsequent read, if the CPU again fails to find the required data in the cache, the write buffer must be flushed prior to having the CPU read-around the write buffer in order to ensure that the main memory has the most recent data. The problem with this approach is that over time a significant number of write buffer flushes are required, and, as previously explained, this slows the overall system performance.

Therefore, there existed a need to provide a computer system that permits multiple read-arounds prior to requiring a write buffer flush.

SUMMARY OF THE INVENTION

In accordance with one embodiment of this invention, it is an object of this invention to provide a computer system permitting multiple write buffer read-arounds prior to a write buffer flush.

It is another object of this invention to provide a method of operating a computer system in order to permit multiple write buffer read-arounds prior to a write buffer flush.

It is a further object of this invention to provide a write buffer that permits both partial and full data flushes.

It is yet another object of this invention to provide a computer system permitting multiple write buffer read-arounds without having to snoop or prematurely flush the write buffer.

It is still another object of this invention to provide a computer system having improved memory latency.

BRIEF DESCRIPTION OF THE PREFERRED EMBODIMENTS

In accordance with one embodiment of this invention, a computer system permitting multiple write buffer read-arounds is disclosed comprising, in combination, CPU (Central Processing Unit) means for executing cycles for the computer system, cache means coupled to the CPU means for storing data, write buffer means coupled to the CPU means for receiving write data from the CPU means, and signal means coupled between the cache means and the write buffer means for permitting the CPU means to read-around the write buffer a plurality of times before the write data in the write buffer is flushed therefrom. The system further comprises bus arbiter means coupled to the CPU means, the cache means, and the write buffer means for determining which of the CPU means and the write buffer means gains control of a bus, slave device means coupled to the bus arbiter means for interacting with at least one of the CPU means, the cache means, and the write buffer means, and second signal means coupled between the write buffer means and the bus arbiter means for informing the bus arbiter means when data stored within the write buffer means is also stored within the cache means and for permitting the write data to be written from the write buffer means to the slave device means. The second signal means comprises a plurality of lines connected between the write buffer means and the bus arbiter means. The slave device means comprises one or more slave devices. The signal means further comprises cache write signal means coupled between the cache means and the write buffer means for informing the write buffer means when data has been written into the cache means, tag match signal means coupled between the cache means and the write buffer means for informing the write buffer means when a tag portion of an address on a bus matches a tag portion of an address stored in the cache means, and cache hit signal means coupled between the cache means and the write buffer means for informing the write buffer when a selected portion of data within the cache means is valid. The second signal means further comprises WB (Write Buffer) coherent signal means coupled between the write buffer means and the bus arbiter means for informing the bus arbiter means when the write data stored within the write buffer means is also stored within the cache means, WB request signal means coupled between the write buffer means and the bus arbiter means for requesting authorization from the bus arbiter means to write the write data from the write buffer means to the slave device means, WB grant signal means coupled between the write buffer means and the bus arbiter means for granting the authorization from the bus arbiter means to the write buffer means to write the write data from the write buffer means to the slave device means, and WB bus means coupled between the write buffer means and the bus arbiter means for transferring the write data to the slave device means from the write buffer means. The write buffer means includes coherency bit means located therein for determining when the write data located in the write buffer means is also stored in the cache means and for permitting partial flushes of the write data from the write buffer means. The slave device means may comprise a memory device. The slave device means may comprise at least one of a RAM (Random Access Memory) device and a ROM (Read Only Memory) device.

In accordance with another embodiment of this invention, a method of operating a computer system in order to permit multiple write buffer read-arounds is disclosed comprising the steps of providing CPU (Central Processing Unit) means for executing cycles for the computer system, providing cache means coupled to the CPU means for storing data, providing write buffer means coupled to the CPU means for receiving write data from the CPU means, and providing signal means coupled between the cache means and the write buffer means for permitting the CPU means to read-around the write buffer a plurality of times before the write data in the write buffer is flushed therefrom. This method further comprises the steps of providing bus arbiter means coupled to the CPU means, the cache means, and the write buffer means for determining which of the CPU means and the write buffer means gains control of a bus, providing slave device means coupled to the bus arbiter means for interacting with at least one of the CPU means, the cache means, and the write buffer means, and providing second signal means coupled between the write buffer means and the bus arbiter means for informing the bus arbiter means when data stored within the write buffer means is also stored within the cache means and for permitting the write data to be written from the write buffer means to the slave device means. The step of providing the second signal means comprises the step of providing a plurality of lines connected between the write buffer means and the bus arbiter means. The step of providing the slave device means comprises the step of providing one or more slave devices. The step of providing the signal means further comprises the steps of providing cache write signal means coupled between the cache means and the write buffer means for informing the write buffer means when data has been written into the cache means, providing tag match signal means coupled between the cache means and the write buffer means for informing the write buffer means when a tag portion of an address on a bus matches a tag portion of an address stored in the cache means, and providing cache hit signal means coupled between the cache means and the write buffer means for informing the write buffer when a selected portion of data within the cache means is valid. The step of providing the second signal means further comprises the steps of providing WB (Write Buffer) coherent signal means coupled between the write buffer means and the bus arbiter means for informing the bus arbiter means when the write data stored within the write buffer means is also stored within the cache means, providing WB request signal means coupled between the write buffer means and the bus arbiter means for requesting authorization from the bus arbiter means to write the write data from the write buffer means to the slave device means, providing WB grant signal means coupled between the write buffer means and the bus arbiter means for granting the authorization from the bus arbiter means to the write buffer means to write the write data from the write buffer means to the slave device means, and providing WB bus means coupled between the write buffer means and the bus arbiter means for transferring the write data to the slave device means from the write buffer means. The step of providing the write buffer means includes the step of providing coherency bit means located therein for determining when the write data located in the write buffer means is also stored in the cache means and for permitting partial flushes of the write data from the write buffer means. The step of providing the slave device means may comprise the step of providing a memory device. The step of providing the slave device means may comprise the step of providing at least one RAM (Random Access Memory) device. The step of providing the slave device means may comprise the step of providing at least one ROM (Read Only Memory) device.

The foregoing and other objects, features, and advantages of the invention will be apparent from the following, more particular, description of the preferred embodiment of the invention, as illustrated in the accompanying drawing.

DESCRIPTION OF THE PREFERRED EMBODIMENTS

Figure 1:
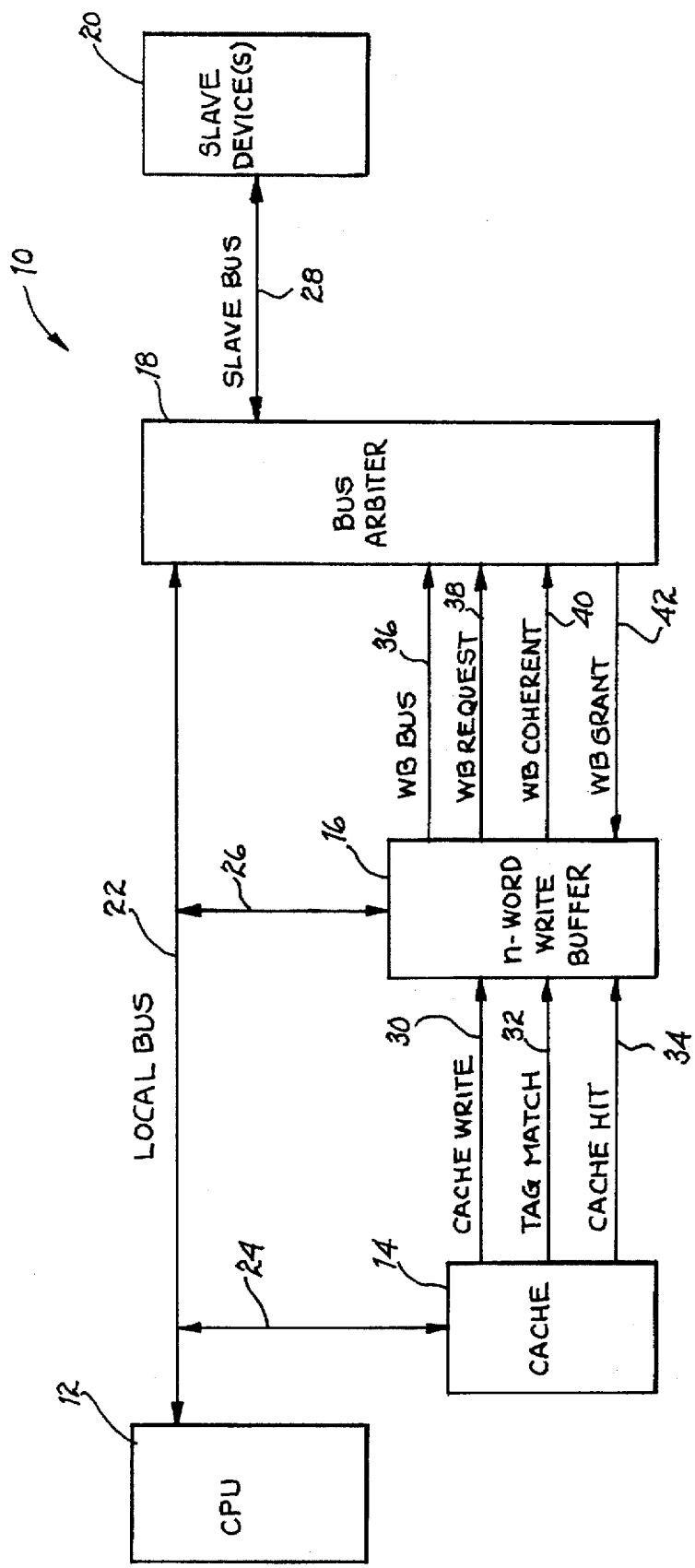
FIG. 1 is a simplified block diagram of the computer system permitting multiple write buffer read-arounds.

Referring to FIG. 1, a simplified block diagram of the computer system permitting multiple write buffer read-arounds is shown and is generally designated by reference number 10. A CPU 12 is included for executing cycles for the system 10. In general, any CPU that executes bus cycles involving address, data, and control signals may be implemented, however, in a preferred embodiment, the CPU 12 is an Intel 80386 type CPU. The CPU 12 is coupled to the cache 14 via the local bus 22 and bus 24, to the n-word write buffer 16 or simply the write buffer 16 via the local bus 22 and bus 26, and to the bus arbiter 18 via the local bus 22. The bus arbiter 18 is coupled to one or more slave devices 20 (note only one is shown) via the slave bus 28.

The cache 14 provides cache write signals, tag match signals, and cache hit signals via lines 30–34, respectively, to the write buffer 16 in order to permit the CPU 12 to read-around the write buffer 16 a plurality of times before the write data in the write buffer 16 is flushed therefrom. The write buffer 16 provides WB request signals and WB coherent signals via lines 38 and 40 to the bus arbiter 18. The bus arbiter 18 provides WB grant signals via line 42 to the write buffer 16, and the write buffer 16 provides a WB bus 36 coupled to the bus arbiter 18 for transferring data from the write buffer 16 to the slave device 20 via the bus arbiter 18. The WB coherent signals inform the bus arbiter 18 when data stored within the write buffer 16 is also stored within the cache 14. The WB request signals, the WB grant signals, and the WB bus 36 permit the write data to be written from the write buffer 16 to the slave device 20.

Although many different types of cache may be implemented, in a preferred embodiment, the cache 14 is a look-aside cache 14. In other words, the look-aside cache 14 is located to the side of the local bus 22 via bus 24, rather than being located in-line with the local bus 22 and the CPU 12. In a preferred embodiment, the cache 14 is partitioned into 256 blocks as follows. Address bits A25–A11 determine the tag for each of the 256 blocks and the address bits A10–A3 determine the index for each of the 256 blocks. Each of the 256 blocks has associated therewith 4 words of 16-bit data, and address bits A2 and A1 are used to select any 1 of the 4 data words for the selected block of data. Thus, the proper tag and index determine which of the 256 blocks of the cache 14 are being addressed, and the address bits A1 and A0 are used to select any 1 of the 4 data words for the selected block of data. Additionally, each of the 256 blocks of the cache 14 has a separate validation bit for each data word of a particular block. Thus, each block, having 4 data words, would also have 4 validation bits corresponding in a one-to-one manner with the 4 data words. The validation bits determine if corresponding data word is valid or not. It cannot be overemphasized that although this is a preferred embodiment of the cache 14, it is not meant to limit the types of cache 14 that may be implemented into the system 10, either in size and/or in configuration of the cache 14, although the number of valid bits per block must be greater than one. The write buffer 16 is, in a preferred embodiment, an N-word FIFO (First-In-First-Out) register. Each of the N entries in the writer buffer 16 includes an address, data, and a coherency bit. Each coherency bit determines if the associated data is also located in the cache 14. Accordingly, when each coherency bit in the write buffer 16 is set into the coherent state, then each piece of data in the write buffer 16 is also in the cache 14, and the write buffer 16 is said to be coherent. The bus arbiter 18 is coupled to the CPU 12, the cache 14, and the write buffer 16 for determining which of the CPU 12 and the write buffer 16 gains control of the slave bus 28. The slave device 20 is coupled to the bus arbiter 18 for interacting with at least one of the CPU 12, the cache 14, and the write buffer 16. The slave device 20 may comprise a memory device such as a RAM (Random Access Memory) device or a ROM (Read Only Memory) device. In general though, the slave device 20 can be any device, such as a memory controller or an I/O device, that can respond to CPU 12 bus cycles.

OPERATION

The cache write signals inform the write buffer 16 when data has been written into the cache 14. The tag match signals inform the write buffer 16 when the tag portion of an address on the local bus 22 matches the tag portion of an address stored in the cache 14. The cache hit signals inform the write buffer 16 when a selected word of data within the cache 14 is valid. The WB coherent signals inform the bus arbiter 18 when the write data stored within the write buffer 16 is also stored within the cache 14. The WB request signals are for requesting authorization from the bus arbiter 18 to write the write data from the write buffer 16 to the slave device 20 via the bus arbiter 18. The WB grant signals are for granting the authorization from the bus arbiter 18 to the write buffer 16 to write the write data from the write buffer 16 to the slave device 20 via the WB bus 36 and the bus arbiter 18. The coherency bits located in the write buffer 16 are for determining when the write data located in the write buffer 16 is also stored in the cache 14 and for permitting partial flushes of the write data from the write buffer 16.

In order to facilitate a better understanding of the operation of the system 10, the following examples are provided. There are generally 4 main types of CPU 12 cycles present in the system 10, namely, memory reads, memory writes, I/O reads, and I/O writes. There are also some special cycles such as interrupt acknowledge cycles. Any special cycle and all I/O cycles cause the write buffer 16 to be flushed. All memory write cycles go through the write buffer 16 where the address, data, and coherency bits are stored. A coherency bit is set if the data that was written to the write buffer 16 was also written to the cache 14, as determined by the cache 14 asserting the cache write signal to the write buffer 16. When the CPU 12 conducts a write cycle, the write data is written to the write buffer 16, which later writes the data therein to the desired address in the slave device 20. If the address of the data write also corresponds to a location in the cache 14, then the data is written not only into the write buffer 16 but also into the cache 14, whereby the cache write signal is asserted to tell the write buffer 16 that the data write that it just received is also in the cache 14. Consequently, that particular word of write data in the write buffer 16 has its coherency bit set. When all of the coherency bits in the valid write buffer 16 entries are set, this means that all of the data that is in the write buffer 16 is also in the cache 14. This data coherency condition is indicated by the write buffer 16 asserting the WB coherent signal on line 40 to the bus arbiter 18. The bus arbiter 18 uses this information to arbitrate the operation of the system 10. The write buffer 16 requests permission from the bus arbiter 18 to write data to the slave device 20 by asserting the WB request signal. When the bus arbiter responds with the WB grant signal, the write buffer 16 is permitted to write its write data over the WB bus 36 and via the bus arbiter 18 to the slave device 20. Of course, when the write buffer is empty, then the WB request signal is not asserted.

Assume that the CPU 12 executes a memory read. If the desired data is in the cache 14, the cache 14 asserts the tag match and the cache hit signals, and the data is delivered to the CPU 12 from the cache 14. However, assume that on a subsequent read cycle, the desired data is not in the cache 14. In this case, the CPU 12 must get the desired data from the slave device 20. When the CPU 12 reads around the cache 14 and the write buffer 16 to get data from the slave device 20 or the main memory, this is called a read-around. The data read from the main memory 20 is delivered to the CPU 12, and it is also typically written into the cache 14 based on the assumption that it may be needed by the CPU 12 again. This write of data into the cache 14 causes the cache write signal to be asserted, however, assume the tag match signal is not asserted. In this case, the write buffer detects the write to the cache and the tag mismatch. Assuming that there was initially data coherency between the cache 14 and the write buffer 16, the assertion of the cache write signal and the non-assertion of the tag match signal or the assertion of a "tag mismatch" indicates to the write buffer 16 that there is no longer data coherency. Thus, the write buffer 16 sets all of its coherency bits to the non-coherent state, and the WB coherent signal is no longer asserted. On a subsequent CPU read cycle, assuming that the data is not in the cache 14, no more read-arounds can be performed because there is no longer data coherency between the cache 14 and the write buffer 16. Accordingly, the write buffer 16 is flushed to the slave device 20.

Now, assume that data coherency exists again between the cache 14 and the write buffer 16. On a subsequent read cycle, assume that the tag for the desired data is in the cache 14, but the desired data is invalid. In this case, since valid data was not in the cache 14 and since there is data coherency between the cache 14 and the write buffer 16 (i.e. all data in the write buffer 16 is also in the cache 14), it is permissible for the CPU 12 to read-around the cache 14 and the write buffer 16 in order to get the desired data from the slave device 20. The data read from the main memory 20 is delivered to the CPU 12, and it is also written into the cache 14. In this case, although the cache 14 has the desired tag, the original data word associated therewith was not valid, and this is the reason why the CPU 12 did not get the data from the cache 14 in the first place. Thus, the data word from the main memory 20 is written into the cache 14 over the previously invalid data word. Accordingly, the cache write signal and the tag match are asserted, thereby informing the write buffer 16 that data coherency between the cache 14 and the write buffer 16 still exists.

On a subsequent read from the CPU 12, assume that the data word is again not in the cache 14. There is still data coherency, so another read-around is permitted, thereby establishing a plurality of read-arounds prior to requiring the write buffer 16 to flush its data. This time as the data word from the main memory 20 is written into the cache 14, assume that there is a tag mismatch. This write of data into the cache 14 causes the cache write signal to be asserted, however, the tag match signal is not asserted since there is no tag match. If, originally, there were a tag match and a valid data word, the CPU 12 would have gotten the data from the cache 14 in the first place, and there would be no need to do a read-around. In this case, the write buffer detects the write to the cache 14 and the tag mismatch. Assuming that there was initially data coherency between the cache 14 and the write buffer 16, the assertion of the cache write signal and the non-assertion of the tag match signal or the assertion of a "tag mismatch" indicates to the write buffer 16 that a potentially valid data word in the cache 14 has been overwritten and there may no longer be data coherency. Thus, the write buffer 16 sets all of its coherency bits to the non-coherent state, and the WB coherent signal is no longer asserted. On a subsequent CPU read cycle, assuming that the data is not in the cache 14, no more read-arounds can be performed until the write buffer 16 is flushed because there is no longer data coherency between the cache 14 and the write buffer 16. Accordingly, the write buffer 16 is flushed to the slave device 20.

In summary, if a CPU 12 write cycle is being performed, the write buffer coherency bit associated with the written data word is set if the data word is also written into the cache 14 as determined by the assertion of the cache write signal. If the CPU 12 is performing a read cycle that is a data word cache 14 hit, the data word is taken directly from the cache 14. During a CPU 12 read miss (i.e. the valid data word is not in the cache 14), the coherency of the write buffer 16 is checked (i.e. the state of the coherency signal from the write buffer 16 is checked), and if the coherency signal is asserted, the CPU 12 reads-around the cache 14 and the write buffer 16. Such read-arounds may occur as many times as there exists data coherency between the cache 14 and the write buffer 16. If a read-around results in the cache 14 being updated to write over invalid data therein, without replacing a valid tag, then the cache write and the tag match signals are asserted in order to inform the write buffer 16 that data coherency is still maintained. However, if the read-around results in a valid tag in the cache 14 being overwritten, as indicated by the assertion of the cache write signal and the non-assertion of the tag match signal, the write buffer 16 is informed that data coherency no longer exists. Consequently, all of the coherency bits in the write buffer 16 are cleared in order to prevent further read-arounds prior to flushing the write buffer 16. It should be pointed out that when a read-around occurs causing a loss of data coherency, all the coherency bits in the write buffer 16 are cleared, and as a result, a complete flush of the write buffer 16 will be required. In contrast, during a write cycle, when the data word is written into the write buffer 16, but not into the cache 14, only the coherency bit associated with that data word is set to non-coherent. Accordingly, only a partial flush of that non-coherent data word from the write buffer 16 is required to re-establish data coherency. Yet, if even a single word in the write buffer 16 is not coherent, then the WB coherent signal is not asserted until that word is flushed from the write buffer 16.

The bus arbiter 18 includes logic for establishing the following arbitration priority from highest to lowest priority:

a) When a write buffer 16 request to send data to the slave device 20 occurs, and a CPU 12 non-memory cycle request occurs, the write buffer 16 request is granted to write its data to the slave device 20;

b) When a write buffer 16 request to send data to the slave device 20 occurs, and the write buffer 16 data is non-coherent, the write buffer 16 request is granted to write its data to the slave device 20;

c) When a CPU 12 read miss occurs and the write buffer 16 is coherent, the CPU 12 read-around is granted; if a cache 14 tag is replaced, all coherent bits are cleared in the write buffer 16 in order to require a write buffer 16 flush prior to another CPU 12 read-around;

d) When a write buffer 16 request to send data to the slave device 20 occurs and the CPU 12 has made no request, the write buffer 16 request is granted to write its data to the slave device 20;

e) When a CPU 12 request is made and the write buffer 16 is empty, the CPU 12 cycle is granted.

The implementation of the lines 36-42 permits the write buffer 16 to write data to the slave device 20 in parallel with a CPU 12 read hit to the cache 14. These lines 36-42 also permit the write buffer 16 to write data to the slave device 20 in parallel with CPU 12 writes as long as the write buffer 16 is not full.

It should also be pointed out that when the cache 14 has multiple entries per block, the ratio of tag replacement read misses to the total number of read misses is approximately equal to 1/number of entries per block. A tag replacement read miss is a write over of one data word corresponding to an existing tag in the cache 14. For example, assume that there are 4 data words per block in the cache 14, read-arounds are occurring from sequential locations from the slave device 20, and further assume that the first read-around will write over a tag in the cache 14. This is a tag replacement read miss. Since the read-arounds are occurring from sequential locations from the cache 14, the next three data words will likely have the same tag as the previous tag from the previous tag replacement read miss. Thus, for the next three read-arounds, there is a tag match, so the ratio of the number of tag replacement read misses to the number of total read misses would be ¼. Only the tag replacement read miss would cause a loss of coherency and a resultant write buffer 16 flush; the other three read-arounds would not cause a tag replacement, and, therefore, there would not be a loss of coherency for these later three read-arounds. Accordingly, the probability of the write buffer 16 becoming incoherent from a read-around would be reduced, approximately, by this factor of 1/number of entries per block. Thus, in general, as the number of entries per block increases, the number of read-arounds performed prior to requiring a write buffer 16 flush increases, and so, if desired, one could use more or less than 4 entries per block.

While the invention has been particularly shown and described with reference to the preferred embodiments thereof, it will be understood by those skilled in the art that the foregoing and other changes in form and details may be made therein without departing from the spirit and scope of the invention.

What is claimed is:

1. A computer system permitting multiple write buffer read-arounds comprising, in combination:

CPU (Central Processing Unit) means for executing cycles for said computer system;

cache means coupled to said CPU means for storing data;

write buffer means coupled to said CPU means for receiving write data from said CPU means;

bus arbiter means coupled to said CPU means and said write buffer means for determining which of said CPU means and said write buffer means gains control of a bus;

signal means coupled to said write buffer means for signalling when data coherency exists between said cache means and said write buffer means and for permitting said CPU means to read-around said write buffer a plurality of times as long as said data coherency exists between said cache means and said write buffer means.

2. The system of claim 1 further comprising slave device means coupled to said bus arbiter means for interacting with at least one of said CPU means, said cache means, and said write buffer means.

3. The system of claim 2 wherein said slave device means comprises a plurality of slave devices.

4. The system of claim 2 wherein said signal means comprises:

first signal means coupled between said cache means and said write buffer means for informing said write buffer when valid data is written into said cache means and for informing said write buffer when an address on a bus matches an address stored in said cache; and second signal means coupled between said write buffer means and said arbiter means for informing said bus arbiter means when data stored within said write buffer means is also stored within said cache means and for permitting said write data to be written from said write buffer.

5. The system of claim 4 wherein said first signal line means comprises:

cache write signal means coupled between said cache means and said write buffer means for informing said write buffer means when data has been written into said cache means;

tag match signal means coupled between said cache means and said write buffer means for informing said write buffer means when a tag portion of an address on a bus matches a tag portion of an address stored in said cache means; and cache hit signal means for informing said write buffer when a selected portion of data within said cache means is valid.

6. The system of claim 4 wherein said second signal means comprises:

WB (Write Buffer) coherent signal means coupled between said write buffer means and said bus arbiter means for informing said bus arbiter means when said write data stored within said write buffer means is also stored within said cache means;

WB request signal means coupled between said write buffer means and said bus arbiter means for requesting authorization from said bus arbiter means to write said write data from said write buffer means to said slave device means;

WB grant signal means coupled between said write buffer means and said bus arbiter means for granting said authorization from said bus arbiter means to said write buffer means to write said write data from said write buffer means to said slave device means; and WB bus means coupled between said write buffer means and said bus arbiter means for transferring said write data to said slave device means from said write buffer means.

7. The system of claim 1 wherein said write buffer means includes coherency bit means located therein for determining when said write data located in said write buffer means is also stored in said cache means and for permitting full and partial flushes of said write data from said write buffer means to reestablish said data coherency exists between said cache means and said write buffer means.

8. The system of claim 2 wherein said slave device means comprises a memory device.

9. The system of claim 2 wherein said slave device means comprises at least one of a RAM (Random Access Memory) device and a ROM (Read Only Memory).

10. A computer system permitting multiple write buffer read-arounds comprising, in combination:

CPU (Central Processing Unit) means for executing cycles for said computer system;

cache means coupled to said CPU means for storing data;

write buffer means coupled to said CPU means for receiving write data from said CPU means;

bus arbiter means coupled to said CPU means and said write buffer means for determining which of said CPU means and said write buffer means gains control of a bus;

slave device means coupled to said bus arbiter means for interacting with at least one of said CPU means, said cache means, and said write buffer means;

first signal means coupled between said cache means and said write buffer means for informing said write buffer when valid data is written into said cache means and for informing said write buffer when an address on a bus matches an address stored in said cache, said first signal means comprising:

cache write signal means coupled between said cache means and said write buffer means for informing said write buffer means when data has been written into said cache means;

tag match means coupled between said cache means and said write buffer means for informing said write buffer means when a tag portion of an address on a bus matches a tag portion of an address stored in said cache means; and cache hit signal means for informing said write buffer when a selected portion of data within said cache means is valid;

second signal means coupled between said write buffer means and said arbiter means for informing said bus arbiter means when data stored within said write buffer means is also stored within said cache means and for permitting said write data to be written from said write buffer, said second signal means comprising:

WB (Write Buffer) coherent signal means coupled between said write buffer means and said bus arbiter means for informing said bus arbiter means when said write data stored within said write buffer means is also stored within said cache means;

WB request signal means coupled between said write buffer means and said bus arbiter means for requesting authorization from said bus arbiter means to write said write data from said write buffer means to said slave device means;

WB grant signal means coupled between said write buffer means and said bus arbiter means for granting said authorization from said bus arbiter means to said write buffer means to write said write data from said write buffer means to said slave device means; and WB bus means coupled between said write buffer means and said bus arbiter means for transferring said write data to said slave device means from said write buffer means; and coherency bit means located within said write buffer means for determining when said write data located in said write buffer means is also stored in said cache means and for permitting full and partial flushes of said write data from said write buffer means to reestablish said data coherency exists between said cache means and said write buffer means.

11. A method for providing a computer system permitting multiple write buffer read-arounds comprising the steps of:

providing CPU (Central Processing Unit) means for executing cycles for said computer system;

providing cache means coupled to said CPU means for storing data;

providing write buffer means coupled to said CPU means for receiving write data from said CPU means;

providing bus arbiter means coupled to said CPU means and said write buffer means for determining which of said CPU means and said write buffer means gains control of a bus;

providing signal means coupled to said write buffer means for signalling when data coherency exists between said cache means and said write buffer means and for permitting said CPU means to read-around said write buffer a plurality of times as long as said data coherency exists between said cache means and said write buffer means.

12. The method of claim 11 further comprising the step of providing slave device means coupled to said bus arbiter means for interacting with at least one of said CPU means, said cache means, and said write buffer means.

13. The method of claim 12 wherein said step of providing slave device means comprises the step of providing a plurality of slave devices.

14. The method of claim 12 wherein said step of providing signal means further comprises the steps of:

providing first signal means coupled between said cache means and said write buffer means for informing said write buffer when valid data is written into said cache means and for informing said write buffer when an address on a bus matches an address stored in said cache; and providing second signal means coupled between said write buffer means and said arbiter means for informing said bus arbiter means when data stored within said write buffer means is also stored within said cache means and for permitting said write data to be written from said write buffer.

15. The method of claim 14 wherein said step of providing first signal line means further comprises the steps of:

providing cache write signal means coupled between said cache means and said write buffer means for informing said write buffer means when data has been written into said cache means;

providing tag match signal means coupled between said cache means and said write buffer means for informing said write buffer means when a tag portion of an address on a bus matches a tag portion of an address stored in said cache means; and providing cache hit signal means for informing said write buffer when a selected portion of data within said cache means is valid.

16. The system of claim 14 wherein said step of providing second signal means further comprises the steps of:

providing WB (Write Buffer) coherent signal means coupled between said write buffer means and said bus arbiter means for informing said bus arbiter means when said write data stored within said write buffer means is also stored within said cache means;

providing WB request signal means coupled between said write buffer means and said bus arbiter means for requesting authorization from said bus arbiter means to write said write data from said write buffer means to said slave device means;

providing WB grant signal means coupled between said write buffer means and said bus arbiter means for granting said authorization from said bus arbiter means to said write buffer means to write said write data from said write buffer means to said slave device means; and providing WB bus means coupled between said write buffer means and said bus arbiter means for transferring said write data to said slave device means from said write buffer means.

17. The method of claim 11 wherein said step of providing write buffer means further comprises the step of providing coherency bit means located within said write buffer means for determining when said write data located in said write buffer means is also stored in said cache means and for permitting full and partial flushes of said write data from said write buffer means to reestablish said data coherency exists between said cache means and said write buffer means.

18. The method of claim 12 wherein said step of providing slave device means further comprises the step of providing a memory device.

19. The method of claim 12 wherein said step of providing slave device means comprises the step of providing at least one of a RAM (Random Access Memory) device and a ROM (Read Only Memory).

* * * * *